United States Patent [19]
Sallis

[11] 3,990,174
[45] Nov. 9, 1976

[54] ANIMAL TRAP

[76] Inventor: Charles B. Sallis, 3828 S. Ellis, Chicago, Ill. 60653

[22] Filed: Sept. 5, 1975

[21] Appl. No.: 610,578

[52] U.S. Cl. ................................................. 43/85
[51] Int. Cl.² ...................................... A01M 23/30
[58] Field of Search ............... 43/85, 81, 77, 78, 86

[56] References Cited
UNITED STATES PATENTS

| | | | |
|---|---|---|---|
| 901,851 | 10/1908 | Thompson | 43/85 |
| 940,877 | 11/1909 | Janke | 43/85 |
| 3,534,493 | 10/1970 | Dahlgren | 43/85 |

*Primary Examiner*—Warner H. Camp
*Attorney, Agent, or Firm*—David D. Kaufman

[57] ABSTRACT

A trap comprising a three-dimensional frame formed by a pair of spaced, superposed bent wire rings. A coil spring is mounted on the frame and its free end functions as a gripping arm capable of radial movement between the rings. Two-part latch means is mounted on one of the frame sides, near its mid-point, and operates pivotally in a plane transverse to the plane of the frame. Trigger means is attached to one of the latch members and lies spaced from and generally parallel to the frame plane when the trap is set.

9 Claims, 6 Drawing Figures

ANIMAL TRAP

This invention relates to animal traps and more particularly to an animal trap designed for capture of relatively small animals with a minimum of damage to the animal and its hide.

Traps of the type which purport to capture animals with a non-destructive, wedging body hold are old and well known. In general, such traps comprise an open frame and a spring-urged holding or gripping arm which cooperates with a portion of the frame to wedge the animal therebetween. These traps may be said to operate in a single plane as compared to others having opposed jaws or a scissors-like action. As a result, they frequently are capable of use and operation in smaller areas and tighter places. Despite these desirable features, however, the prior traps have nonetheless been characterized by various shortcomings which have limited their effectiveness.

Animals with which the invention is concerned range from the smallest, like mink, weasel, and squirrel, through slightly larger, lke racoon, opossum, muskrat and skunk, up to the largest, like beaver and otter. Because of their light weight, these small animals can be readily thrown free of a trap by any glancing blow which fails to grip a sufficient part of their bodies. The position of the animal with relation to the trap frame when it activates the trigger mechanism is thus of great importance.

Applicant is aware of numerous prior art traps, such as, U.S. Pat. Nos. 218,532; 314,602; 390,021; 680,114; 734,413; 3,109,254; and 3,512,296, which are subject to springing or release when the animal is not sufficiently within the trap framework. In all of these prior art structures (except U.S. Pat. No. 3,109,254), the latch mechanism acts upon the spring-urged gripping arm, or indirectly upon a second spring-urged arm coupled to the gripping arm, at or near the free ends of these arms. Similarly, the triggers which trip the latches are positioned near an outer extremity of the trap frames and their activating movement is in the same plane as the frames. Those skilled in the art will thus appreciate that such triggers may be readily activated by animals totally outside of the trap or insufficiently within the trap frame to be caught by the gripping arm. Furthermore, it is possible, in some of the prior structures, for a small animal to pass completely through the trap without brushing or moving the trigger.

It is, therefore, a principal object of this invention to provide a wedging-action animal trap which overcomes the problems described hereinabove. A related object is to provide such an animal trap in which the trigger mechanism is positioned so that activation thereof will occur only when an animal has sufficiently entered into the trap framework.

Another object is to provide an animal trap of the character described having latch means and cooperating trigger means which move and operate in a plane transverse or normal to the plane of the trap frame.

A further object is to provide an animal trap of the character described in which the latch means are adapted to latch the gripping arm at a point intermediate its length and, preferrably, near its middle. A related object is to provide such an animal trap in which the gripping arm may be shorter than customary so that the trap requires a minimum of space for operation.

Still another object is to provide an animal trap of the character described in which the trigger is positioned opposite a central area of the frame so that activation thereof by an animal attempting to pass through the frame is virtually assured.

Yet another object is to provide an animal trap of the character described in which the trigger may be adjusted for activation at varying distances from the plane of the frame, thereby rendering the trap versatile for the capture of animals of different sizes.

Still a further object is to provide an animal trap of the character described which is extremely quick acting and in which the gripping arm itself is directly spring-urged and there are no extraneous arms coupled thereto.

Yet a further object is to provide an animal trap of the character described which may be inexpensively fabricated and yet is simple in structure and operation, durable and most efficient for the purposes intended.

With the foregoing and other objects in view which will appear as the description proceeds, the invention comprises generally a double, rectangular, bent wire frame having one or more rigidifying connector elements. A coil spring is mounted on the frame adjacent one corner thereof and has a free arm which functions as the gripping arm of the trap and is normally urged into contact with a rib connected between the wires which comprise a side of the frame forming the corner. Two-part latch means are pivotally mounted respectively on the opposed wires of the other side of the frame forming the corner at or near the midpoints thereof. Trigger means is connected to one member of the latch means and includes a link projecting transversely away from the frame when the trap is set so that the depending trigger is spaced from and generally parallel to the plane of the frame. Three forms of latch means are disclosed, each operating in a plane transverse to the plane of the trap frame.

For the purpose of facilitating an understanding of my invention, I have illustrated in the accompanying drawings a preferred embodiment and modifications thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings.

Figure 1:
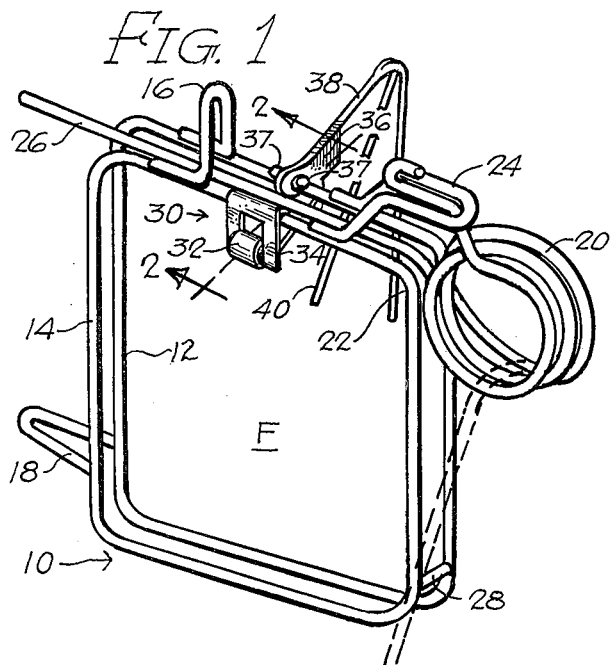
FIG. 1 is perspective view of a preferred form of animal trap embodying the principles of the invention and showing the same in the cocked or set position.
Figure 2:
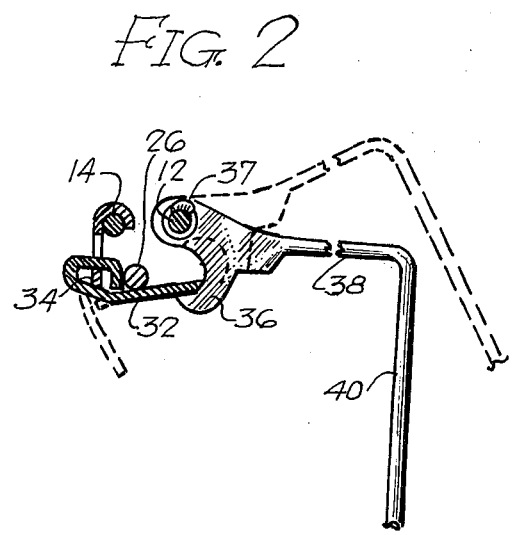
FIG. 2 is a sectional view taken on the plane of line 2—2 in FIG. 1 and viewed in the direction indicated.

Referring in detail to FIG. 1 of the drawings, it will be seen that the reference numeral 10 indicates generally an animal trap embodying the principles of the invention. Trap 10 comprises a pair of bent wire rings 12 and 14 connected together in spaced parallel and superposed relationship. The rings 12 and 14 preferably are rectangular as illustrated, but they may likewise be of other suitable closed-loop configurations, including circular, as will be apparent from the following description.

Spacer elements 16 and 18 are rigidly connected to the rings 12 and 14, as by welding, and they serve to maintain the spaced relationship of the rings. The spacer elements 16 and 18 likewise may be employed for attaching to the trap stakes or securing means in well known manner. The connected rings thus provide an open, three-dimensional, four-sided, planar frame F.

A coil spring 20 is mounted on the frame F adjacent a corner 22 thereof by means of a mounting member 24 welded or otherwise secured to the rings 12 and 14. Coil spring 20 lies generally outside the boundaries of the frame F, but in the same plane. The free end of the coil spring 20 comprises a gripping arm 26 which lies in the plane of the frame F and is thus capable of unimpeded radial movement between the rings 12 and 14. Gripping arm 26 normally is urged to its outermost position shown in dotted line in FIG. 1 of the drawings where its further movement is limited by a rib 28 connected between the rings 12 and 14 on one of the frame sides adjacent the corner 22.

Latch means indicated generally by the reference numeral 30 is mounted on the second frame side adjacent the corner 22, at or near the mid-point of said side. Latch means 30 comprises a male member in the form of a flat arm or tongue 32 pivotally mounted on an eyelet 34 mounted rigidly from the ring 14. A female member in the form of a hook or catch 36 is pivotally mounted on the ring 12 opposite the tongue 32. Suitable abutment members such as the knurs 37, 37 are formed or otherwise provided on the ring 12 for retaining the hook 36 opposite the tongue 32.

Connected to, or integrally formed with, the catch 36 is an arm 38 having a pair of bifurcated extensions 40, 40, bent or depending from the free end thereof. Arm 38 and extensions 40 together comprise the trigger means of the trap and function in the manner to be described.

When the trap is at rest, the gripping arm 26 is in engagement with the rib 28 and the latch member 32 and 36 are disengaged and hang freely and pivotally from their respective rings 14 and 12. To set the trap, gripping arm 26 is rotated clockwise as viewed in FIG. 1, placing coil 20 under tension. Latch members 32 and 36 are engaged under gripping arm 26 which thereupon is urged downwardly against the tongue 32. In this set condition, it will be noted that the arm 38 projects substantially perpendicularly away from the plane of the frame F, while the extensions 40 lie substantilly parallel to said plane. It should also be noted that the trigger extensions are spaced from the plane of frame F and in alignment with a substantial portion of the central area thereof. Thus, an animal must enter into the trap approximately the length of arm 38 before it contacts the extensions 40, such contact being virtually assured because of the central positioning of the extensions. Movement of the trigger results in rotation of the catch 36 whereupon the downward urging of the gripping arm 26 on the tongue 32 aids in opening the latch 30, making operation of the trap quite sensitive. Gripping arm 26 thereupon springs free and makes direct contact with the animal to wedge the same between itself and the rings 12 and 14 or rib 28.

Trigger arm 38 and extensions 40 desirably are made of wire stock that is sufficiently rigid for operation of the latch but nonetheless bendable by hand. With such bending, the distance between the trigger extensions and the plane of the frame F may be varied to render the trap adaptable for use in trapping animals of different sizes.

Figure 3:
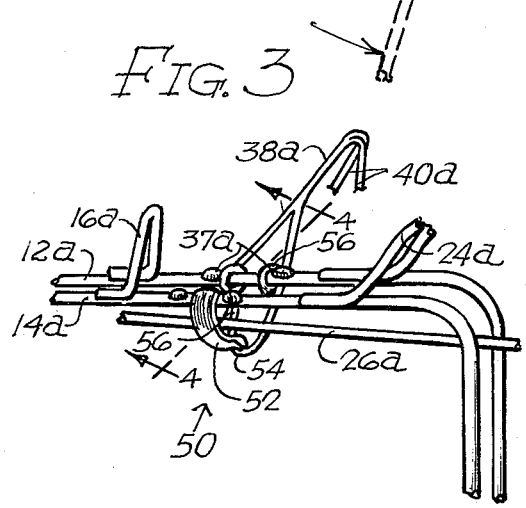
FIG. 3 is a fragmentary perspective view similar to FIG. 1 and illustrating a modified form of latch means.
Figure 4:
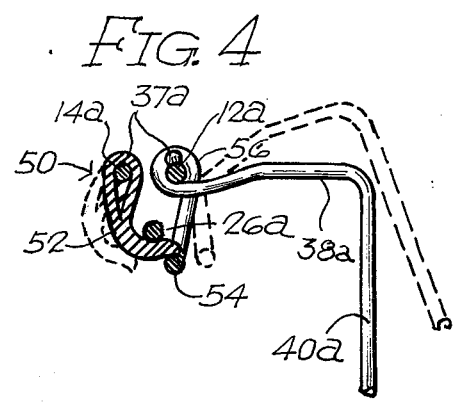
FIG. 4 is a sectional view taken on the plane of line 4—4 in FIG. 3 and viewed in the direction indicated.

In FIGS. 3 and 4 there is illustrated a modified form of latch means 50 wherein similar parts bear the same reference numerals with the suffix "a" added. Thus, latch means 50 comprises a male member in the form of an inverted, arcuate claw 52 which is pivotally mounted on the ring 14a. The female latch member comprises an eyelet 54 which is pivotally mounted on the ring 12a by loops 56, 56, all integrally bent from wire to likewise provide the trigger arm 38a and the extensions 40a.

Figure 5:
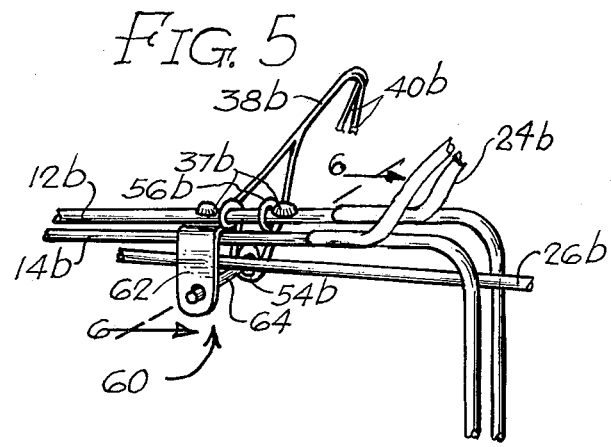
FIG. 5 is a fragmentary perspective view similar to FIG. 1 and illustrating another modified form of latch means.
Figure 6:
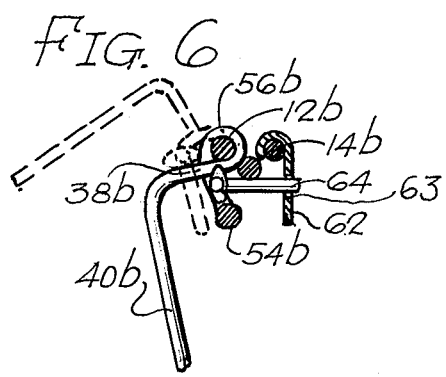
FIG. 6 is a sectional view taken on the plane of line 6—6 in FIG. 5 and viewed in the direction indicated.

Another form of latch means 60 is illustrated in FIGS. 5 and 6 of the drawings wherein similar parts bear the same reference numberals but with the suffix "b." Latch means 60 comprises a female plate 62 rigidly depending from the ring 14b and having a hole 63 formed therein. As in the form of FIGS. 3 and 4, a bent wire eyelet 54b is pivotally mounted by loops 56b on ring 12b. Here, however, a pin 64 is carried by the eyelet 54b and is capable of limited pivotal movement. Thus, the pin 64 is capable of double movement, namely, rotational with the trigger and pivotal by virtue of its mounting in eyelet 54b.

I claim:
1. An animal trap comprising:
  a pair of rings connected together in spaced, superposed relationship and defining an open threedimensional planar frame;
  a coil spring mounted on said frame having a free arm lying in the plane of said frame;
  co-operating latch members mounted respectively on each of said rings and operable in a plane transverse to the plane of said frame for engagement with each other;
  said latch members being positioned to engage said free arm at a point intermediate its length; and
  an elongated trigger means connected to one of said latch members and lying outside the plane of said frame,
  said free arm being movable between a spring-tensioned first position wherein it is engaged by said latch members and a spring-urged second position wherein it cooperates with a portion of the frame to function as a gripping arm and wedge an animal therebetween.

2. The animal trap of claim 1 in which said trigger means comprises:
  a wire arm connected to said one latch member; and
  a pair of wire extensions connected to the opposite end of said arm,
  said arm extending transversely of the plane of the frame and said extensions lying in a plane substantially parallel to the plane of said frame when the free arm is in said first position.

3. The animal trap of claim 2 in which said arm and extensions are hand bendable whereby the distance between the planes of said extensions and frame are adjustable.

4. The animal trap of claim 2 in which said latch members comprise:
  a tongue pivotally mounted from one of said rings; and a hook pivotally mounted on the other of said rings opposite said tongue and adapted to engage the free end thereof whereby said free arm bears downwardly against said tongue when in said first position, said wire arm being connected to said hook.

5. The animal trap of claim 2 in which said latch members comprise:

an inverted, arcuate claw pivotally mounted on one of said rings; and an eyelet pivotally mounted on the other of said rings opposite said claw and adapted to engage the free end thereof whereby said free arm bears downwardly against said claw when in said first position, said wire arm being connected to said eyelet.

6. The animal trap of claim 2 in which said latch members comprise:

a plate rigidly depending from one of said rings and having a hole formed therein;

an eyelet pivotally mounted on the other of said rings opposite said plate; and a pin pivotally mounted in said eyelet, said hole being adapted to receive the free end of said pin whereby said free arm bears downwardly against said pin when in said first position, said wire arm being connected to said eyelet.

7. The animal trap of claim 1 in which said rings are rectangular in configuration, said coil spring being mounted externally of the frame adjacent a corner thereof, said latch members being mounted on a frame side adjacent said corner at a point intermediate the length thereof.

8. the animal trap of claim 7 and comprising further a rib connected between the rings defining the other frame side adjacent said corner, said rib being positioned near the opposite end of said other frame side and cooperating with said free arm to limit the outward spring-urged movement thereof.

9. the animal trap of claim 8 in which the angle subtended by movement of the free arm between said latch members and said rib is approximately 90°.

* * * * *